United States Patent Office.

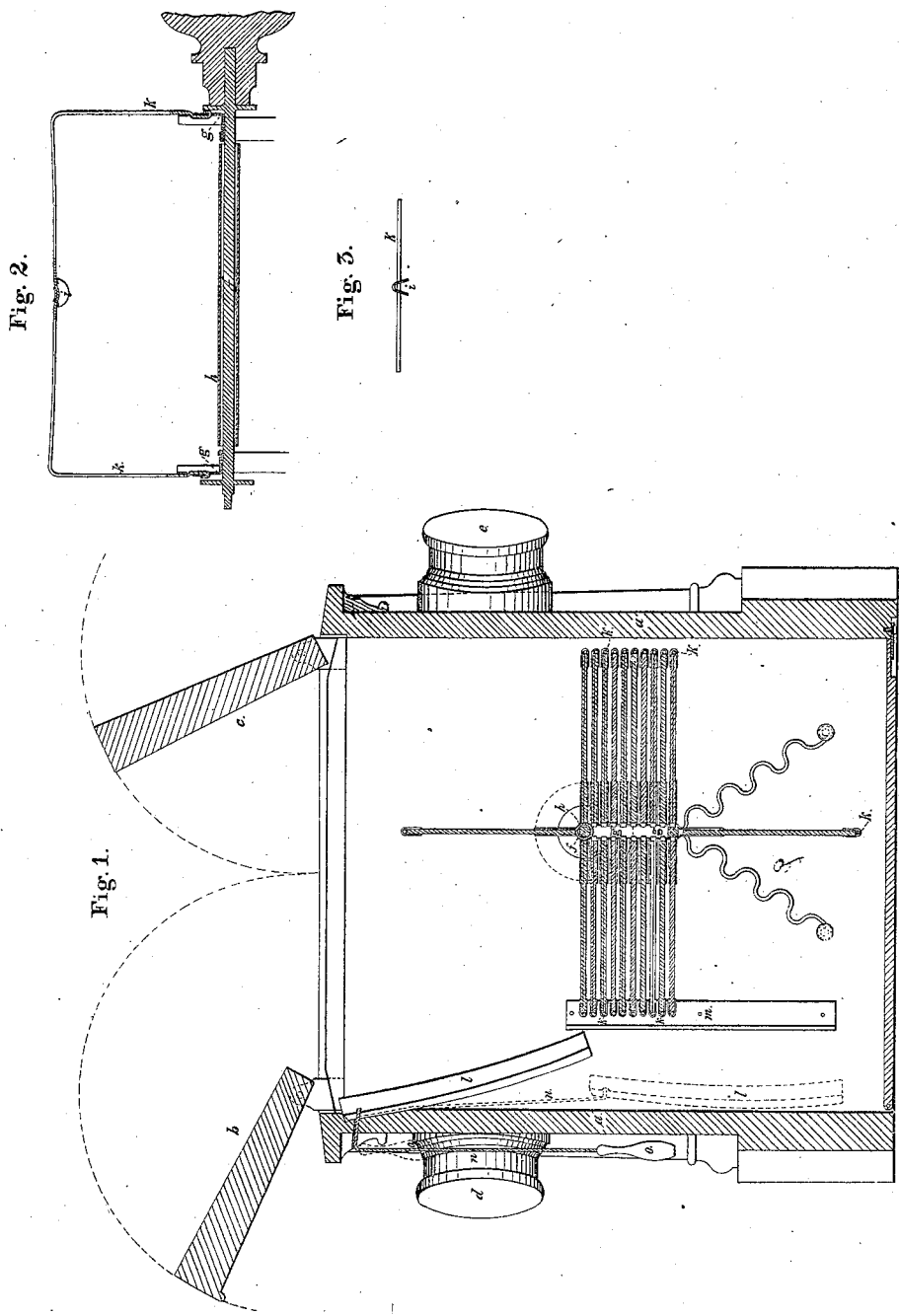

ALEXANDER BECKERS, OF NEW YORK, N. Y.

IMPROVEMENT IN STEREOSCOPES.

Specification forming part of Letters Patent No. 55,044, dated May 29, 1866.

*To all whom it may concern:*

Be it known that I, ALEXANDER BECKERS, of the city and State of New York, have invented, made, and applied to use a certain new and useful Improvement in Stereoscopes; and I do hereby declare the following to be a full, clear, and exact description of the said invention, reference being had to the annexed drawings, making part of this specification, wherein—

Figure 1 is a vertical section of my improved stereoscope transversely of the pictures. Fig. 2 is a section longitudinally of the clasp for holding the edge of the picture, and Fig. 3 illustrates the mode in which said clasp is put upon the wire frame.

Similar marks of reference denote the same parts.

Stereoscopic boxes have heretofore been made to hold several pictures upon a belt, so that they might be presented, one after the other, to view through the lenses, and such pictures have been in pairs, back to back, in one holder, so as to be viewed by two persons at opposite sides looking into the stereoscope through lenses fitted permanently into the box.

In order to view glass or transparent pictures it has heretofore been necessary to have a window fitted into the box for transmitting the light when the reflectors above are closed. In some stereoscopes this window has been movable, so that a second pair of lenses would be introduced in its place to allow of two persons seeing card-pictures placed back to back.

The nature of my said invention consists in a movable reflector introduced within the stereoscope to take the place of the window heretofore employed, so that the two pairs of lenses may be fitted permanently, and this movable reflector, being of a larger size than a movable window, (because of the space occupied by the frame,) gives much more light, and, in connection with the reflecting-lids, allows the light to be thrown more or less upon the top or bottom of the picture, or increased or diminished.

In the drawings, *a* represents the stereoscopic box, of any desired size, shape, or ornamentation. *b* and *c* are the reflecting-lids. *d* and *e* are the pairs of lenses on opposite sides of the box.

*f* is the upper shaft or axis upon which the chain or belt of holders is revolved to present the pictures successively to view. This belt of picture-holders is formed by a series of metal grooves, *g*, united by a belt or chain. Each of these metal grooves is formed of a piece of sheet metal bent up into the form shown, and receiving a piece of strong tape or webbing to connect them together, and by providing a sleeve, *h*, around the shaft (see Fig. 2) the picture-holders are kept properly apart.

From one side to the other of the holder passes a wire or frame, *k*, so as to inclose the space receiving the picture, and near the central part of the wire is a clasp, *i*, formed of a sheet-metal disk or plate, which is perforated with two holes the size of the wire. It is then bent up into a U shape, so as to be threaded over the wire, and then it is straightened out, so that the wire is bent into a small crank shape, as shown in Fig. 2, and the clasp is thereby so firmly connected to the wire that it cannot slide or turn thereon. The sides of the clasp are bent down, so as to take over the edges of the picture and retain it in the holder. The spring of the wire frame *k* is sufficient to allow the clasp to be lifted for taking out or introducing pictures.

*l* is my improved reflector, introduced at one side of the box and guided by flanges *m*, so that it may be raised up or down by a cord, *n*, running through a groove or hole and provided with a counter-weight, *o*, or equivalent device, for raising and lowering the said reflector *l*.

The reflector *l* is to be concave, so that the rays of light thrown off from all parts shall reach the lenses, and thereby all parts of a glass or transparent picture will be equally illuminated.

The reflector *l* should stand at an inclination in order that the rays of light coming into the box from above may be reflected horizontally, and by the reflecting-lids *b* and *c* the light thrown on or passing through the picture may be varied as desired.

The reflector when lowered into the position shown by dotted lines in Fig. 1 is not in the way, and the second pair of lenses may then be used for viewing paper pictures.

If desired, a slide may be introduced in the top part of the box to prevent any rays of light coming upon the front of transparent pictures when the reflector is employed.

What I claim, and desire to secure by Letters Patent, is—

1. A concave mirror or reflector, combined with the stereoscopic box and movable reflectors *b* or *c*, substantially as and for the purposes set forth.

2. The sheet-metal clasp *i*, attached to the wire frame of the picture-holder, as and for the purposes set forth.

In witness whereof I have hereunto set my signature this 16th day of April, A. D. 1866.

ALEX. BECKERS.

Witnesses:
   GEO. D. WALKER,
   CHAS. H. SMITH.